Figure 1:
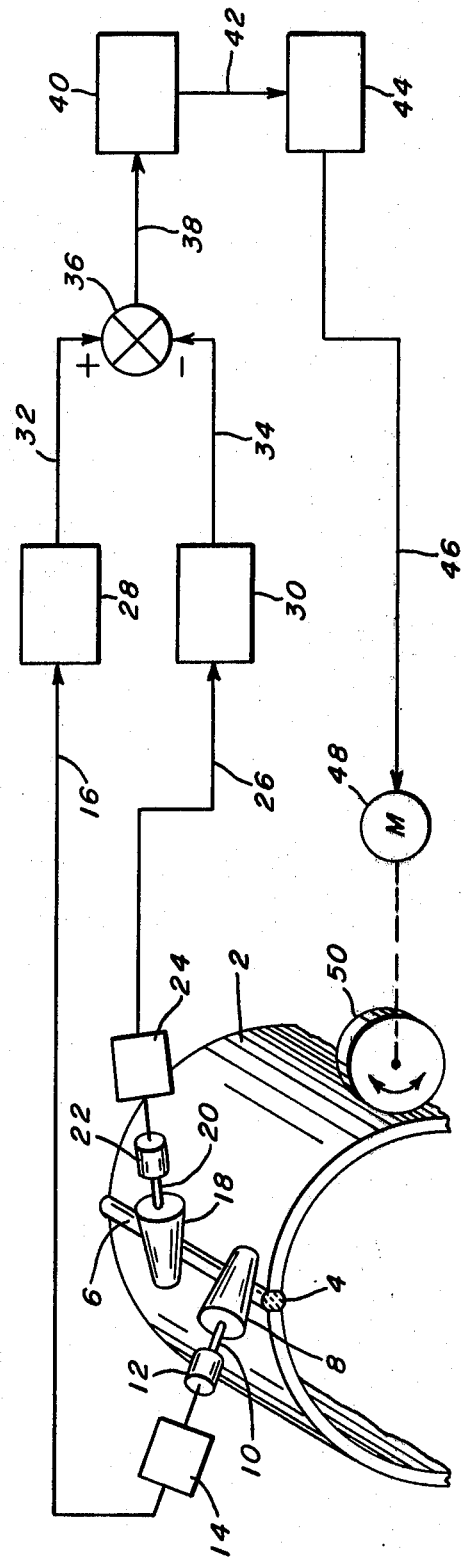

United States Patent [19]

Schindler

[11] 3,970,910
[45] July 20, 1976

[54] WELD TRACKING MECHANISM
[75] Inventor: Donald G. Schindler, Whitehall Boro, Pa.
[73] Assignee: United States Steel Corporation, Pittsburgh, Pa.
[22] Filed: Sept. 30, 1974
[21] Appl. No.: 510,685

[52] U.S. Cl. .......................... 318/576; 219/125 PL
[51] Int. Cl.² ......................................... G05B 19/36
[58] Field of Search .............. 318/576; 219/125 PL, 219/158

[56] References Cited
UNITED STATES PATENTS

| 1,978,042 | 10/1934 | Dodge | 219/125 PL UX |
| 2,121,211 | 6/1938 | Padva et al. | 318/576 X |
| 3,038,686 | 6/1962 | Rumrill et al. | 318/576 X |
| 3,195,111 | 7/1965 | Kunkel | 318/578 X |

FOREIGN PATENTS OR APPLICATIONS

| 635,627 | 1/1962 | Canada | 318/576 |

Primary Examiner—B. Dobeck
Attorney, Agent, or Firm—Rea C. Helm

[57] ABSTRACT

A system for automatically sensing lateral movement of a longitudinally moving weldment bead has two conical shaped contact rollers mounted on generally parallel shafts, generally at right angles to the weldment bead and driven by contact with the weldment bead. The rollers are mounted in opposite directions and define a null point when the roller diameters contacting the bead are the same. A pulse tachometer mounted on each shaft provides different signals when lateral movement of the longitudinally moving weldment bead away from the null point causes the rollers to rotate at different speeds. Electrical circuitry responsive to the different signals actuates a servo mechanism to move the bead to the null point.

5 Claims, 3 Drawing Figures

U.S. Patent   July 20, 1976   3,970,910

WELD TRACKING MECHANISM

This invention relates to a weld tracking system and more particularly to a system which senses the circumferential displacement of the weldment of a length of welded pipe during lineal movement of the pipe through a weld inspection station and then rotates the pipe to compensate for the displacement.

The manufacture of electric welded pipe by the submerged arc process results in a weldment bead projecting slightly, about 3 mm, from the pipe body. The ultrasonic testing of the weldment requires ultrasonic transducers placed on the pipe body on each side of the weld and as a consequence the weld must be maintained in position between the transducer arrangements during lineal movement of the pipe. In fluoroscopic inspection having fixed x-ray tube geometry, the weld must also be maintained in a fixed circumferential position during lineal movement.

In accordance with my invention, a pair of opposing conical shaped contact rollers are positioned with respect to the weldment so that contact with the moving weldment bead causes the rollers to rotate. Each roller drives a pulse tachometer and circumferential displacement of the weldment bead from the desired inspection position results in different rotational speeds and therefore different signals from the pulse tachometers. The signals are used to drive a servo mechanism to align the weldment with respect to the inspection apparatus.

It is therefore an object of my invention to provide a pipe weld tracking system to automatically maintain a weldment bead in alignment with inspection apparatus.

Another object is to provide apparatus for sensing the lateral movement of a narrow elongated object during longitudinal movement of the object.

Figure 2:
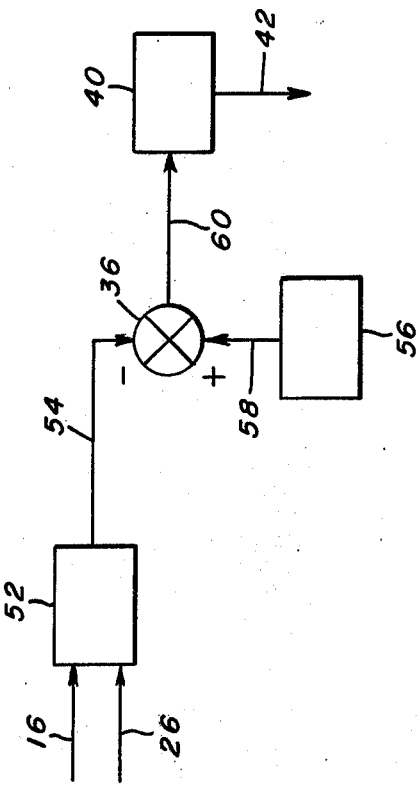
Figure 3:
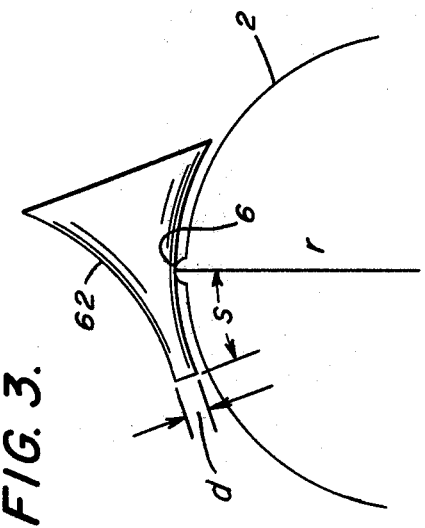

These and other objects will become more apparent after referring to the following specification and drawings in which FIG. 1 is a schematic drawing of one embodiment of the weld tracking system of my invention, FIG. 2 is a schematic drawing of an alternate control system for a weld tracking system, and FIG. 3 is a schematic drawing describing an alternate contact roller.

Referring now to FIG. 1, reference numeral 2 refers to a length of welded pipe which is to be moved in a longitudinal direction for inspection purposes. Only a portion of the pipe is shown. Pipe 2 includes a weld 4 having a weldment bead 6 projecting outwardly from the surface of pipe 2. A left conical shaped contact roller 8 is in contact with the weldment bead 6, and is mounted on one end of a shaft 10. Shaft 10 is generally of right angles to the longitudinal axis of pipe 2 and is mounted for rotation in a bearing assembly 12. A left pulse tachometer 14 is mounted on the other end of shaft 10 and provides an output 16. A right conical shaped contact roller 18 is in contact with the weldment bead 6 and is mounted on one end of a shaft 20. Shaft 20 is generally at right angles to the longitudinal axis of pipe 2 and is mounted for rotation in a bearing assembly 22. A right pulse tachometer 24 is mounted on the other end of shaft 20 and provides an output 26. Rollers 8 and 18 may be either a frustum of a cone as shown or a full cone.

Output 16 is connected to the input of a first frequency to voltage converter 28. Output 26 is connected to the input of a second frequency to voltage converter 30. An output 32 from converter 28 and an output 34 from converter 30 are connected to inputs of a subtractor 36. An output 38 from subtractor 36 is connected to an input of a proportional integral controller 40. An output 42 from controller 40 is connected to an input of a power drive circuit 44. An output 46 of power drive circuit 44 is connected to a motor 48. Motor 48 is connected to drive conventional rotating support rolls 50, one of which is shown.

In operation, the bearing assemblies 12 and 22 are aligned so that the rollers 8 and 18 contact the weldment bead 6 at a null position, the desired reference position, where the diameters of the rollers are the same. The rollers are rotated by frictional contact with the weldment bead 6 with adequate contact force being provided as for example by spring loading, or if the pipe is positioned with the weld on top, by the weight of the roller assemblies. As pipe 2 moves longitudinally, rollers 8 and 18 rotate causing pulse tachometers 14 and 24 to rotate providing pulse outputs 16 and 26 each proportional to rotational speed of rollers 8 and 18 respectively. Assume that the weldment bead drifts in a counterclockwise direction. This decreases the rotational velocity of roller 8 as bead 6 contacts a larger diameter of roller 8 and increases the rotational velocity of roller 18 as bead 6 contacts a smaller diameter of roller 18. The different rotational velocities of tachometers 14 and 24 then provide different frequencies in output 16 and 26 which are converted to different voltage outputs 32 and 34. The difference of outputs 32 and 34, output 38, provides a difference deviation signal which is connected to controller 40, a conventional proportional integral controller which provides a control signal 42. Control signal 42 is connected to power drive circuit 44 to provide a signal 46 proportional to the weldment bead 6 position difference from the reference position on the tracker assembly. Signal 46 turns motor 48 to rotate support rolls 50, turning pipe 2 in clockwise direction to the desired reference position.

The embodiment of FIG. 2, wherein the same reference numerals as used in FIG. 1 indicate the same components, utilizes outputs 16 and 26 in a different way to provide a ratio deviation signal. Pulse tachometer outputs 16 and 26 are connected to inputs of a ratio divider circuit 52. Circuit 52 has an output 54 which is a voltage signal representative of the ratio of signals 16 and 26, and is connected to a first input of subtractor 36. A reference signal source 56, provides a voltage signal 58 representative of a signal ratio of 1 to 1, connected to a second input of subtractor 36. Subtractor 36 has an output signal 60, which is the ratio deviation signal then used by controller 40 in same manner as the embodiment described in FIG. 1.

Signals 16 and 26 can be expressed as $$f = F \, V/2\pi R \tag{1}$$

where
 $f$ is the frequency in pulses per second;
 $F$ is the number of pulses per revolution of the pulse tachometer;
 $V$ is the linear velocity of pipe 2 in mm per second; and
 $R$ is the radius of the roller in mm in contact with the weldment bead 6.

By using the equation (1), signal 38 may be expressed as $$\left( K_1 \frac{FV}{2\pi} \frac{1}{R_L} - \frac{1}{R_R} \right) \quad (2)$$

where $K_1$ is a constant converting frequency to voltage and $R_L$ and $R_R$ are the radii of rollers 8 and 18 respectively in contact with the weldment bead 6.

Equation 2 indicates that the deviation signal 38 and hence the control is dependent upon the lineal velocity, V, of the pipe. Therefore, it is preferred to maintain the pipe inspection speed as uniform as possible and a minimum speed should be maintained for adequate response.

By using equation (1), signal 60 may be expressed as $$\left( K_2 \ 1 - \frac{R_L}{R_R} \right) \quad (3)$$

where $K_2$ is a constant converting frequency to voltage and $R_L$ and $R_R$ are the radii of rollers 8 and 18 respectively in contact with the weldment bead 6.

Equation 3 indicates that the deviation signal 60 is independent of the speed of the pipe and therefore is preferred where the speed of the pipe is likely to change during the inspection process.

Rollers 8 and 18 have been shown and described as having a conical surface, i.e. generated by rotation of a straight line. This results in a linear sensitivity response as the contact point moves away from the null point or reference point on the rollers. If the roller surface is curved to fit the curvature of the pipe, greater sensitivity is obtained. Referring now to FIG. 3, reference numeral 62 indicates a tracking cone having a surface generated by rotation of a curved line approximating the curve of the pipe. In this case, equation (1) becomes $$f = \frac{FV}{2(r - r\cos\frac{s}{r} + \frac{d}{2})} \quad (4)$$

where r is the radius of the pipe;
d is the smallest diameter of the roller; and
s is the circumferential distance from the small end of the roller to the point of contact.

With this type of contact roller equations (2) and (3) would be altered to be based upon equation (4) but the advantages of each type of deviation signal remain the same. While a straight line and a matching pipe curvature line have been shown as lines for generating conical surfaces for the contact rollers, other lines could also be used to generate roller surfaces providing different deviation sensitivities from the null point.

Although the weld tracking system has been shown and described for tracking the weldment bead of welded pipe, obviously the system may be used to sense the lateral movement of any narrow elongated object during longitudinal movement of the object, and by a suitable servomechanism automatically move the elongated object to a desired reference position.

While several embodiments of the weld tracking system have been shown and described, it is apparent that other adaptations and modifications may be made without departing from the scope of the following claims.

I claim:

1. A system for sensing lateral movement of a narrow longitudinally moving object away from a lateral reference position and for moving the object laterally to the reference position comprising
   a pair of adjacent conical shaped contact rollers adapted to contact the moving object and to be rotated by longitudinal movement of the object,
   each of said rollers being mounted on a shaft generally at right angles to the longitudinal dimension of the object and with the large ends of the rollers opposed whereby a lateral reference position is established when the object contacts the rollers at equal roller diameters,
   means connected to each shaft for providing electrical signals indicative of shaft rotation, and
   means connected to the means for providing electrical signals and responsive to different electrical signals for laterally moving the longitudinally moving object to the reference position.

2. A system according to claim 1 in which the means for providing electrical signals is a pulse tachometer and the means for moving the object includes
   a converter connected to the pulse tachometers for converting the pulse tachometer outputs to voltage signals,
   a subtractor connected to the converter for subtracting one voltage signal from the other voltage signal thereby providing a difference deviation signal,
   a servomechanism for laterally moving the longitudinally moving object and
   control means connected to the subtractor and the servomechanism for actuating the servomechanism in response to the difference deviation signal.

3. A system according to claim 1 in which the means for providing electrical signals is a pulse tachometer and the means for moving the object includes
   a ratio divider connected to the pulse tachometers for providing a signal representative of the ratio of the pulse tachometer outputs,
   means for providing a signal representative of a one to one ratio,
   a subtractor connected to the ratio divider and the means for providing a one to one ratio signal for subtracting the signal representative of the ratio of the pulse tachometer outputs from the one to one ratio signal thereby providing a ratio deviation signal,
   a servomechanism for laterally moving the longitudinally moving object and,
   control means connected to the subtractor and the servomechanism for actuating the servomechanism in response to the ratio deviation signal.

4. A system according to claim 1 in which the conical shaped contact rollers each have the shape of a frustum of a right circular cone.

5. A system according to claim 1 in which the lateral movement of the longitudinally moving object is along a path following the segment of a circle and said conical shaped rollers each have a contact surface which is a surface of revolution of a line having a curvature matching the curvature of the circle.

\* \* \* \* \*